United States Patent
Damnjanovic et al.

(10) Patent No.: US 9,350,506 B2
(45) Date of Patent: May 24, 2016

(54) APERIODIC SRS FOR CARRIER AGGREGATION

(75) Inventors: Jelena M. Damnjanovic, Del Mar, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/247,584

(22) Filed: Sep. 28, 2011

(65) Prior Publication Data
US 2012/0257582 A1    Oct. 11, 2012

Related U.S. Application Data

(60) Provisional application No. 61/388,519, filed on Sep. 30, 2010.

(51) Int. Cl.
  *H04W 4/00* (2009.01)
  *H04L 5/00* (2006.01)

(52) U.S. Cl.
  CPC .............. *H04L 5/0048* (2013.01); *H04L 5/001* (2013.01); *H04L 5/0094* (2013.01); *H04L 5/0023* (2013.01)

(58) Field of Classification Search
  None
  See application file for complete search history.

(56) References Cited

U.S. PATENT DOCUMENTS

| | | | |
|---|---|---|---|
| 7,386,306 B2 | 6/2008 | Laroia et al. | |
| 2008/0316957 A1* | 12/2008 | Shen et al. | 370/328 |
| 2009/0197590 A1* | 8/2009 | Borran | H40W 52/242 455/423 |
| 2010/0142466 A1* | 6/2010 | Palanki et al. | 370/329 |
| 2010/0227569 A1 | 9/2010 | Bala et al. | |
| 2010/0246561 A1* | 9/2010 | Shin | H04W 52/32 370/345 |
| 2010/0254329 A1 | 10/2010 | Pan et al. | |
| 2010/0296405 A1* | 11/2010 | Madan | H04J 11/0053 370/252 |
| 2011/0044259 A1 | 2/2011 | Nimbalker et al. | |

(Continued)

FOREIGN PATENT DOCUMENTS

| CN | 101478340 A | 7/2009 |
|---|---|---|
| EP | 2023504 A2 | 2/2009 |

(Continued)

OTHER PUBLICATIONS

Motorola, "Further Details on LTE-A aperiodic SRS", 3gpp draft: R1-103932; vol. RAN WG1; Jun. 22, 2010.*

(Continued)

*Primary Examiner* — Kwang B Yao
*Assistant Examiner* — Hardikkumar Patel
(74) *Attorney, Agent, or Firm* — Arent Fox LLP

(57) ABSTRACT

A method of wireless communication includes receiving overlapping information triggering aperiodic sounding reference signal (SRS) transmission. The method also includes processing the overlapping information in accordance with the received triggering information. The overlapping information can be consistent configuration information for the aperiodic SRS transmission, in which case the processing includes transmitting an aperiodic SRS in accordance with the configuration information. When the overlapping information has dissimilar configurations for the aperiodic SRS transmission, the processing includes treating the overlapping information as an error event. The overlapping information can be a trigger received in an uplink grant and a trigger received in a downlink grant. The wireless system can be a multicarrier system including multiple component carriers.

16 Claims, 15 Drawing Sheets

(56) References Cited

U.S. PATENT DOCUMENTS

| | | | |
|---|---|---|---|
| 2011/0143749 A1* | 6/2011 | Guo et al. .................. 455/424 |
| 2011/0170499 A1* | 7/2011 | Nayeb Nazar ........ H04L 1/1812 370/329 |
| 2011/0171964 A1 | 7/2011 | Lin et al. |
| 2011/0243106 A1* | 10/2011 | Hsu ...................... H04L 5/0096 370/336 |
| 2012/0127900 A1* | 5/2012 | Song .................... H04L 1/0041 370/310 |
| 2013/0201946 A1* | 8/2013 | Lunttila et al. ............. 370/329 |

FOREIGN PATENT DOCUMENTS

| | | |
|---|---|---|
| JP | 2013511203 A | 3/2013 |
| KR | 20100077401 A | 7/2010 |
| WO | 2005109916 A2 | 11/2005 |
| WO | 2010077041 A2 | 7/2010 |
| WO | 2010107880 A2 | 9/2010 |
| WO | 2011108906 A2 | 9/2011 |

OTHER PUBLICATIONS

Alcatel-Lucent Shanghai, et al., "Triggering of Dynamic Aperiodic SRS with Carrier Aggregation", 3GPP Draft; R1-104404, 3rd Generation Partnershi p Project (3GPP), Mobile Competence Centre; 650, Route Des Lucioles ; F- 06921 Sophia-Anti Polis Cedex; France, vol. RAN WG1, no. Madrid, Spain; 20100823, Aug. 18, 2010, XP050450095, [retrieved on Aug. 18, 2010].

International Search Report and Written Opinion—PCT/US2011/054052—ISA/EPO—Jan. 16, 2012.

Motorola, "Further Details on LTE-A Aperiodic SRS", 3GPP Draft; R1-103932—Dynamic Aperiodic SRS LTE-A, 3rd Generation Partnership Project (3GPP), Mobile Competence Centre; 650, Route Des Lucioles ; F-06921 Sophia-Anti Polis Cedex ; France, vol. RAN WG1, no. Dresden, Germany; 20100628, Jun. 22, 2010, XP050449309, [retrieved on Jun. 22, 2010] title sections 2.1, 5.

Pantech, "Further consideration on Aperiodic SRS solutions", 3GPP Draft: R1-102840, 3rd Generation Partnership Project (3GPP), Mobi Le Competence Centre ; 650, Route Des Lucioles ; F-06921 Sophia-Antipolis Cedex ; France, vol. RAN WG1, no. Montreal, Canada; 20100510, May 4, 2010, XP050419825, [retrieved on May 4, 2010] sections 1, 3.

Qualcomm Incorporated, "Aperiodic SRS triggering in CA scenario", 3GPP Draft; R1-105583 Aperiodic SRS for CA, 3rd Generation Partnershi p Project (3GPP), Mobile Competence Centre; 650, Route Des Lucioles; F-06921Sophia-Antipolis Cedex ; France, vol. Ran WG1, no. Xi'an; 20101011, Oct. 6, 2010, XP050450753, [retrieved on Oct. 6, 2010].

Translation of Japanese Office Action for Japanese Application No. 2013-531874 dated Apr. 1, 2014, pp. 1-4.

Notice to File a Response for Korean Application No. 10-2013-7011070 dated Sep. 25, 2014, pp. 1-5.

Chinese Patent Application No. 201180057016.0, "Notification of the First Office Action" dated Jan. 6, 2015, 16 Pages.

Chinese Office Action dated Aug. 5, 2015, for Chinese Patent Application Serial No. 201180057016.0, 7 pages.

Notice to File a Response for Korean Application No. 2013-7011070 dated Mar. 27, 2014, 5 pages.

Translation of Final Office Action for Japanese Application No. 2013-531874 dated Jan. 27, 2015, 2 pages.

Translation of Notice to Final Rejection for Korean Application No. 2013-7011070 dated May 28, 2015, 2 pages.

\* cited by examiner

| Grant for UL CC1 | SRS on UL CC1 | SRS on UL CC2 | SRS on UL CC3 |
|---|---|---|---|
| 00 | | | |
| 01 | X | | |
| 10 | X | | X |
| 11 | X | X | X |

| Grant for UL CC2 | SRS on UL CC1 | SRS on UL CC2 | SRS on UL CC3 |
|---|---|---|---|
| 00 | | | |
| 01 | | X | |
| 10 | | X | X |
| 11 | X | X | |

*FIG. 6*

APERIODIC SRS FOR CARRIER AGGREGATION

CROSS REFERENCE TO RELATED APPLICATION

This application claims the benefit of U.S. provisional patent application No. 61/388,519 to Damnjanovic et al., entitled "Aperiodic SRS for Carrier Aggregation" and filed on Sep. 30, 2010, the disclosure of which is expressly incorporated by reference herein it in its entirety.

BACKGROUND

1. Field

Aspects of the present disclosure relate generally to wireless communication systems, and more particularly, to triggering aperiodic sounding reference signals (SRSs) in a Carrier Aggregation (CA) configuration.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink. Previous technology supported periodic sounding reference signal (SRS) transmission on the uplink (UL) to facilitate features such as UL frequency-selective scheduling, UL power control, time tracking, and downlink scheduling utilizing UL-DL (uplink-downlink) channel reciprocity for Time Division Duplex (TDD).

Aperiodic SRS transmissions can be triggered by uplink grants, but the details of triggering of dynamic aperiodic SRS in the case of multiple uplink CCs (component carriers) was not previously determined.

SUMMARY

According to an aspect of the present disclosure, a method of wireless communication includes receiving overlapping information triggering aperiodic sounding reference signal (SRS) transmission. The method also includes processing the overlapping information in accordance with the received triggering information.

In another aspect, a method of wireless communication in a multicarrier system having multiple component carriers includes receiving a downlink grant including information triggering aperiodic sounding reference signal (SRS) transmission for at least one of the component carriers. The method also includes transmitting the SRS in accordance with the received triggering information.

In yet another aspect, an apparatus for wireless communication includes means for receiving overlapping information triggering aperiodic sounding reference signal (SRS) transmission. The apparatus also has means for processing the overlapping information in accordance with the received triggering information.

In a further aspect, an apparatus of wireless communication in a multicarrier system having multiple component carriers includes means for receiving a downlink grant including information triggering aperiodic sounding reference signal (SRS) transmission for at least one of the component carriers. The apparatus also includes means for transmitting the SRS in accordance with the received triggering information.

In another aspect, an apparatus for wireless communication includes a memory, and at least one processor coupled to the memory. The processor(s) is configured to receive overlapping information triggering aperiodic sounding reference signal (SRS) transmission. The processor(s) is also configured to process the overlapping information in accordance with the received triggering information.

In another aspect, an apparatus for wireless communication in a multicarrier system having multiple component carriers, includes a memory, and at least one processor coupled to the memory. The processor(s) is configured to receive a downlink grant including information triggering aperiodic sounding reference signal (SRS) transmission for at least one of the component carriers. The processor(s) is also configured to transmit the SRS in accordance with the received triggering information.

In yet another aspect, a computer program product for wireless communication in a wireless network has a non-transitory computer-readable medium having non-transitory program code recorded thereon. The program code includes program code to receive overlapping information triggering aperiodic sounding reference signal (SRS) transmission. The program code also includes program code to process the overlapping information in accordance with the received triggering information.

In a still further aspect, a computer program product for wireless communication in a readable medium having non-transitory program code recorded thereon. The program code includes program code to receive a downlink grant including information triggering aperiodic sounding reference signal (SRS) transmission for at least one of the component carriers. The program code also includes program code to transmit the SRS in accordance with the received triggering information.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIG. 6 is a table illustrating an example configuration for SRS triggering specific to the grant for CC1 and CC2.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
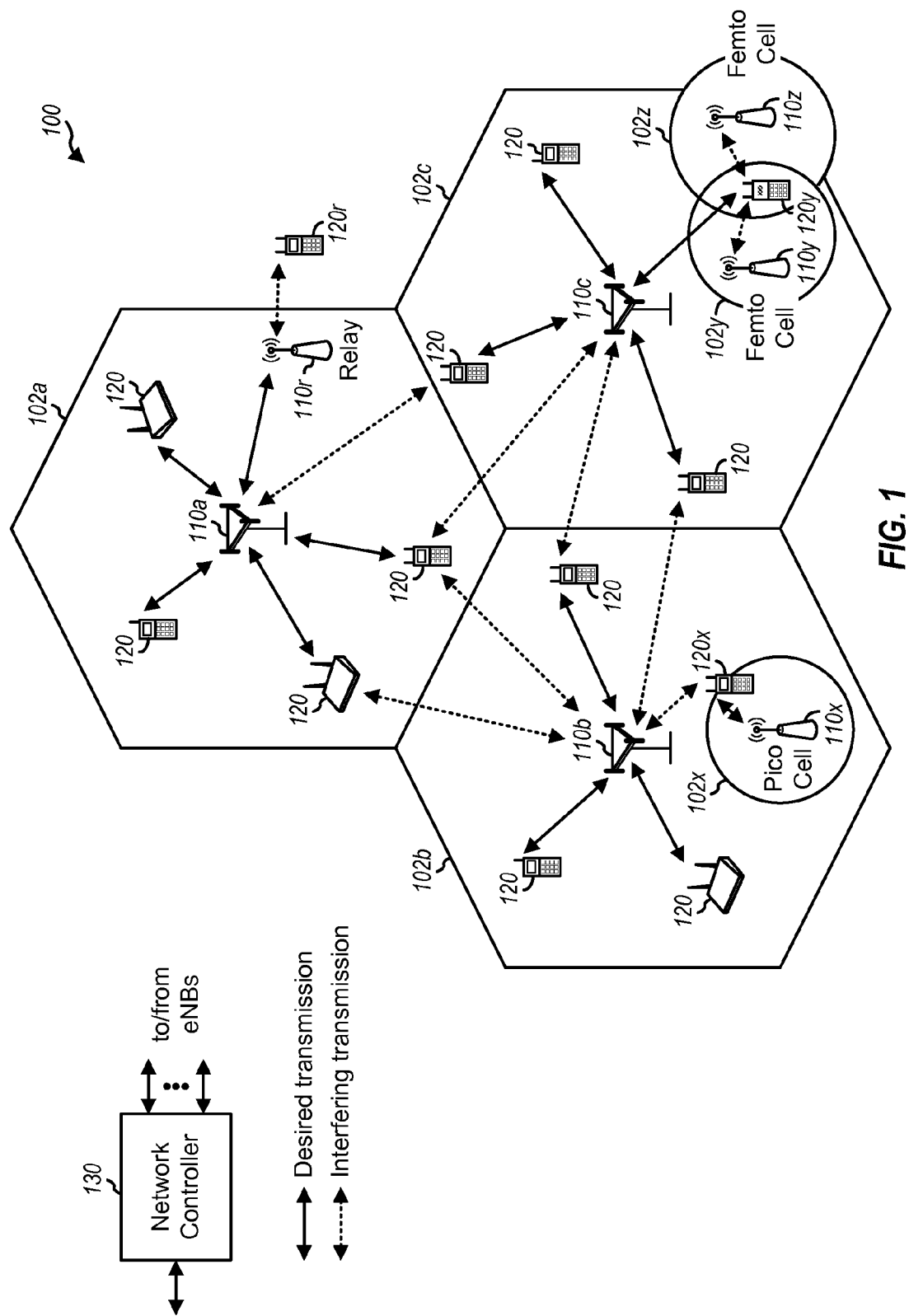
FIG. 1 is a block diagram conceptually illustrating an example of a telecommunications system.

FIG. 1 shows a wireless communication network 100, which may be an LTE-A network, in which aperiodic SRS triggering may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110*a* and the UE 120*r*. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2A:
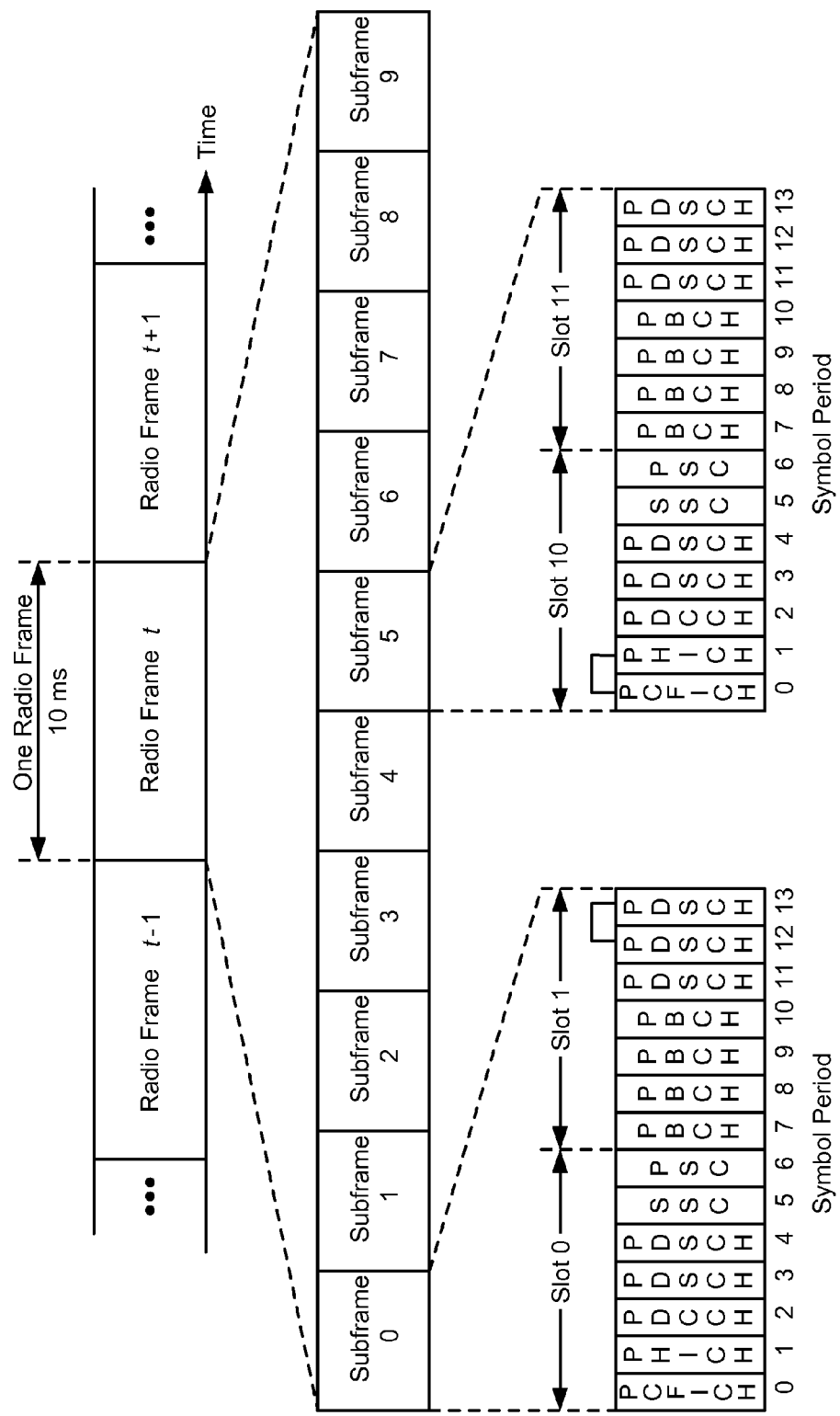
FIG. 2A is a block diagram conceptually illustrating an example of a down link frame structure in a telecommunications system.

FIG. 2A shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2A) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2A. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2A. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2A, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2A. The PHICH may carry information to support hybrid automatic repeat request (HARM). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 2B:
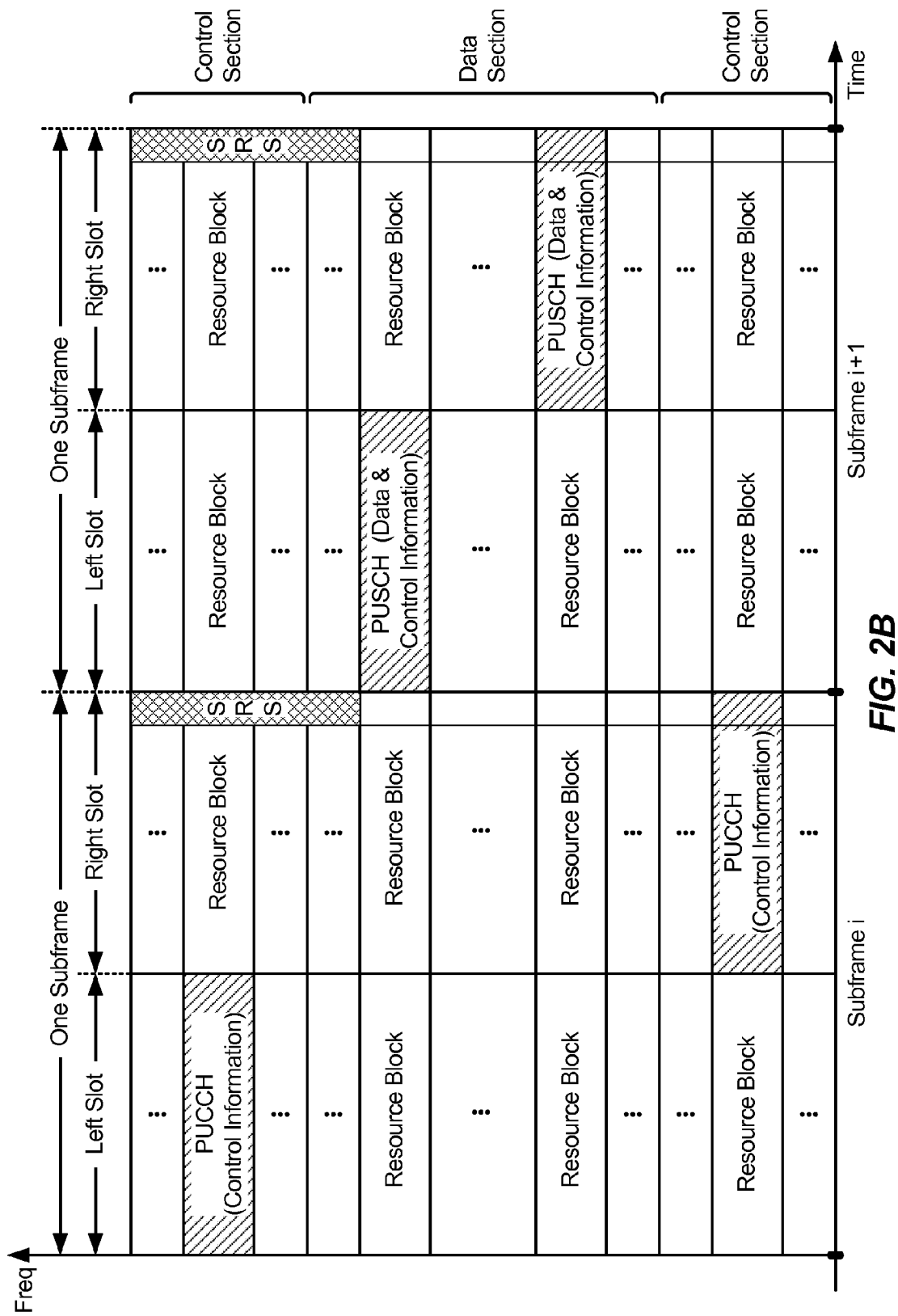
FIG. 2B is a block diagram conceptually illustrating an example frame structure in uplink communications.

FIG. 2B is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2B results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 2B. According to one aspect, in relaxed single carrier operation, parallel channels may be transmitted on the UL resources. For example, a control and a data channel, parallel control channels, and parallel data channels may be transmitted by a UE. A sounding reference signal (SRS) can be transmitted in the last symbol of a subframe.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 3:
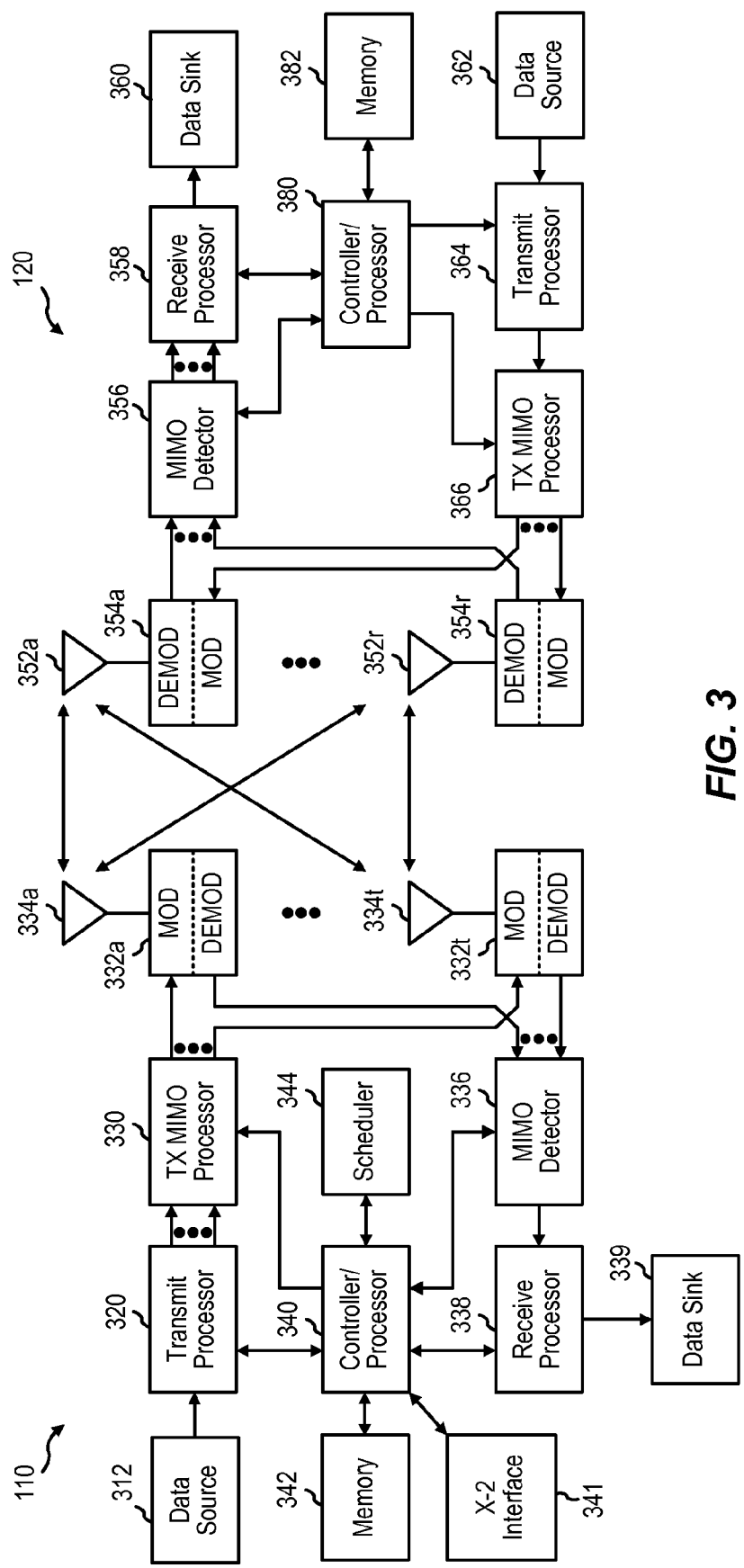
FIG. 3 is a block diagram conceptually illustrating a design of a base station/eNB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. The base station 110 may be the macro eNodeB 110*c* in FIG. 1, and the UE 120 may be the UE 120*y*. The base station 110 may also be a base station of some other type. The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332*a* through 332*t* may be transmitted via the antennas 334*a* through 334*t*, respectively.

At the UE 120, the antennas 352*a* through 352*r* may receive the downlink signals from the base station 110 and may provide received signals to the demodulators (DEMODs) 354*a* through 354*r*, respectively. Each demodulator 354*a* may condition (e.g., filter, amplify, downconvert, and digitize) a respective received signal to obtain input samples. Each demodulator 354*a* may further process the input samples (e.g., for OFDM, etc.) to obtain received symbols. A MIMO detector 356 may obtain received symbols from all the demodulators 354*a* through 354*r*, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354*a* through 354*r* (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface 341.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 7-8E and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for receiving overlapping aperiodic SRS triggering information. In one aspect, the aforementioned means may be the controller/processor 380, the memory 382, the receive processor 358, the demodulators 354a, and/or the antennas 352a configured to perform the functions recited by the aforementioned means. The UE 120 also includes means for processing overlapping information. In one aspect, the aforementioned means may be the controller/processor 380, and/or the memory 382 configured to perform the functions recited by the aforementioned means. In another aspect, the aforementioned means may be a module or any apparatus configured to perform the functions recited by the aforementioned means.

In one configuration, the UE 120 for wireless communication includes means for receiving downlink grant information. In one aspect, the aforementioned means may be the controller/processor 380, the memory 382, the receive processor 358, the demodulators 354a, and/or the antennas 352a configured to perform the functions recited by the aforementioned means. The UE 120 also includes means for transmitting the SRS. In one aspect, the aforementioned means may be the controller/processor 380, the memory 382, the transmit processor 364, the modulators 354a, and/or the antennas 352a configured to perform the functions recited by the aforementioned means. In another aspect, the aforementioned means may be a module or any apparatus configured to perform the functions recited by the aforementioned means.

Carrier Aggregation

LTE-Advanced uses spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
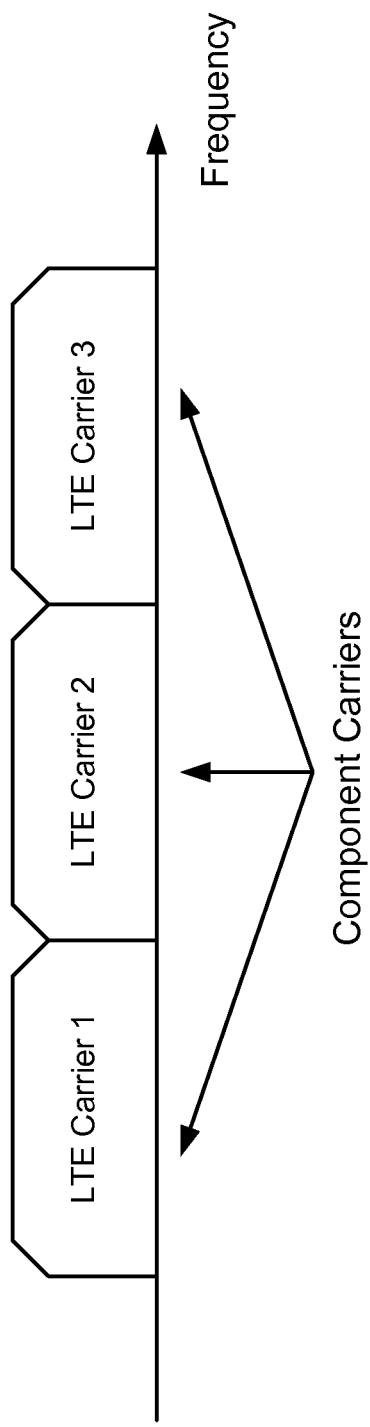
FIG. 4A discloses a continuous carrier aggregation type.
Figure 4B:
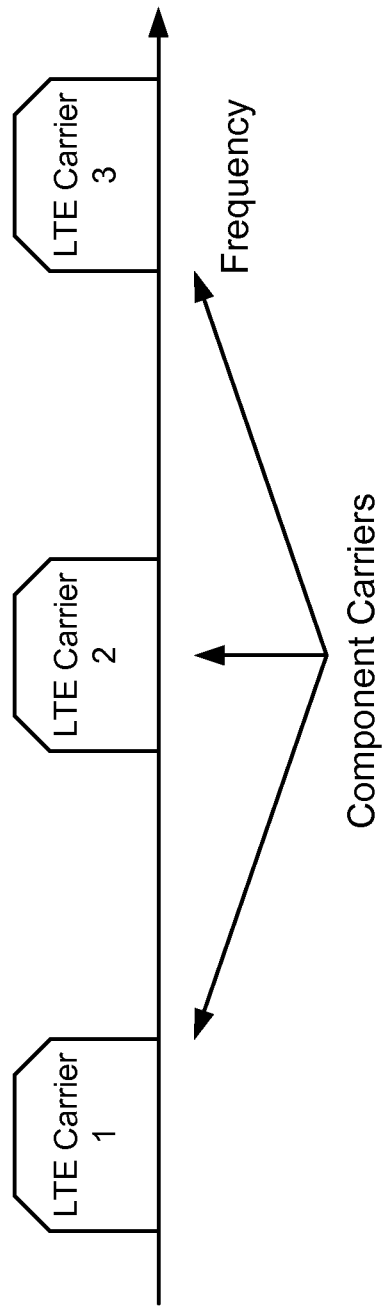
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs are deployed with non-continuous CA in LTE-Advanced UE since the carriers are separated along the frequency band. Since non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5A:
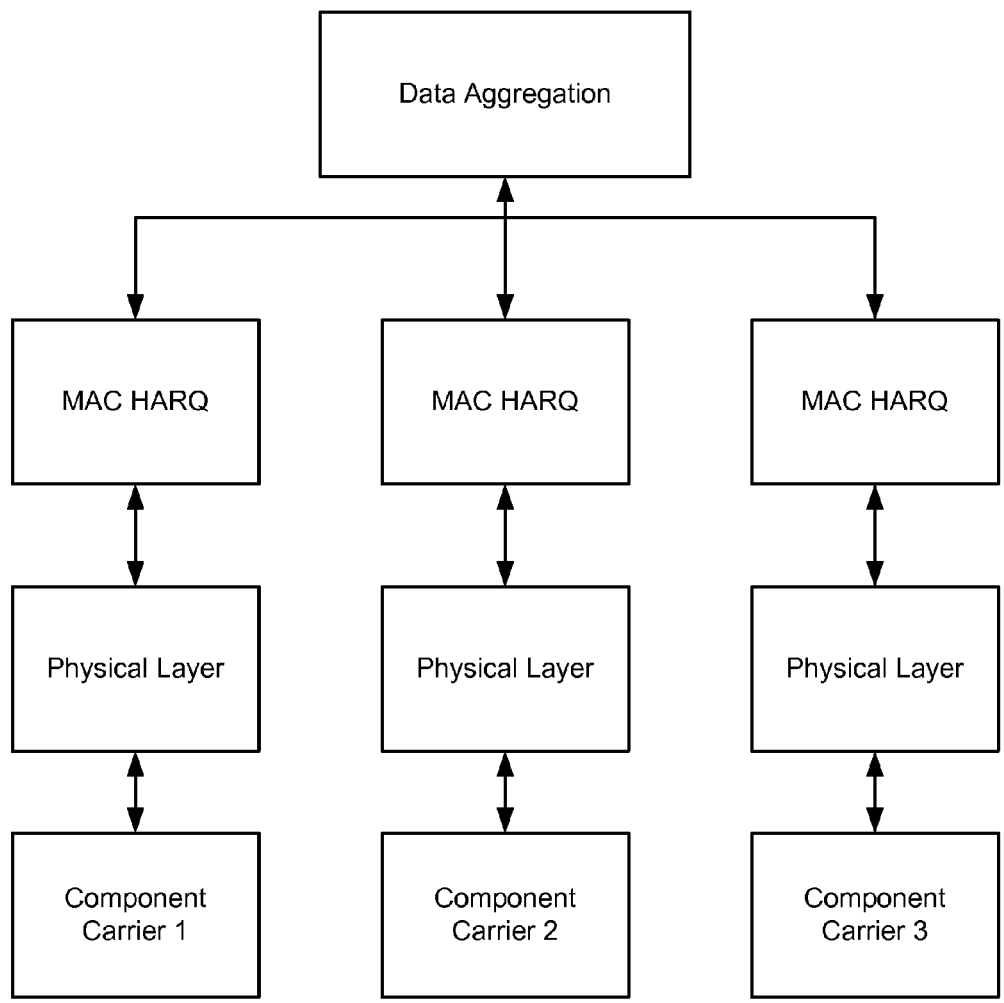
FIG. 5A discloses MAC layer data aggregation.
Figure 5B:
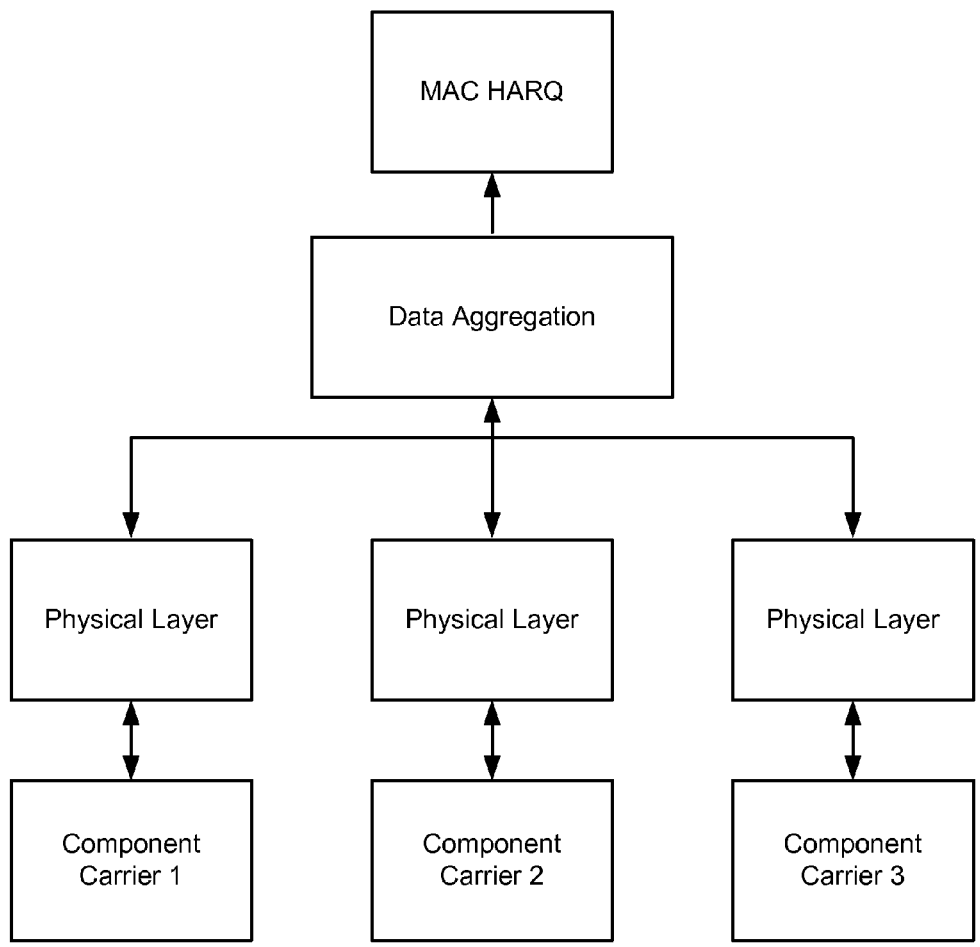
FIG. 5B discloses PHY layer data aggregation.

FIGS. 5A and 5B illustrate aggregating transmission blocks (TBs) from different component carriers at the medium access control (MAC) layer (FIG. 5A) or the physical layer (FIG. 5B) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. On the other hand, one HARQ entity is used for all the aggregated component carriers with a physical layer data aggregation method, and new transmission configuration parameters should be specified for the entire aggregated bandwidth. Since the transmission parameters are configured independently for each component carrier using the MAC layer data aggregation, MAC layer data aggregation may support more flexible and efficient data transmissions in both uplink and downlink as compared to the physical layer data aggregation. However, this may come at the expense of multiple control channels. Since the same physical layer and MAC layer configuration parameters and schemes for the LTE systems can be used in future LTE-Advanced systems, backward compatibility may be ensured.

Asymmetric CA

Data traffic in uplink and downlink channels may be asymmetric. To address this asymmetry, the numbers of aggregated component carriers in two directions may be different, thus improving spectrum efficiency in LTE-Advanced systems. However, because it is difficult for an LTE Advanced eNB to know the component carrier which the UE used as the anchor carrier in the downlink during the random access process, an asymmetric CA may cause ambiguity in downlink component carrier selection. As a result, the eNB cannot transmit the random access response to the UE without identifying the exact component carriers selected by the UE for the downlink. There are three methods that may be used for solving this problem.

The first method configures a physical random access channel (PRACH) on each component carrier with different parameters. When the UE sends its random access request according to the PRACH configuration parameters of a specific downlink component carrier, the eNB may identify this downlink component carrier by checking the UE's PRACH preamble via an uplink component carrier.

The second method involves configuring all the downlink component carriers with the same PRACH parameters. It involves broadcasting to every associated downlink component carrier of the uplink carrier used by the UE for sending its random access request an initial random access response. The initial random access response has specific transmission configuration parameters and requested information, such as cell-radio network temporary indication and uplink grant resource allocation. The corresponding eNB, upon receiving a further response from the UE, can identify the downlink component carrier to which the UE is attached, i.e. anchor carrier.

The third method uses only one downlink component carrier to bear the control channels relevant to the random access process (e.g., physical broadcast channel and synchronization channel). As every uplink component carrier links to this common downlink carrier, the eNB does not need to detect the downlink component carrier to which UE is attached. Although this method may be simpler than the first two, it is not flexible in load balancing or system deployment. For LTE-Advanced systems working in time-division duplex (TDD) mode, another method of achieving asymmetric CA involves adjusting the ratio of allocated time slots for uplink and downlink transmissions. This method makes it possible for TDD systems to utilize the channel reciprocity property to facilitate the use of beamforming and precoding techniques.

In addition, it simplifies the resource allocation relationship between the uplink and downlink channels.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Aperiodic SRS for Carrier Aggregation

Aperiodic SRSs (sounding reference signals) can provide SRS transmissions as needed in a carrier aggregation configuration. The primary use for an SRS is estimating channel quality to enable frequency selective scheduling on the uplink. The last SC-FDMA symbol in a subframe contains the SRS. An example configuration is shown in FIG. 2B. Aperiodic transmissions can be triggered by information received by the UE (user equipment) such as, but not limited to uplink (UL) grants, downlink (DL) grants and control blocks for group power control. A downlink grant may carry control information for data transmission on the downlink. An uplink grant may carry control information for data transmission on the uplink. A grant may be sent to a specific UE or a group of UEs. A grant may also be referred to as an assignment. SRS transmissions can be triggered both implicitly and via RRC (radio resource control) configuration. The implicit triggering assumes that a UL grant can trigger SRS on the assignment on the component carrier for which it is intended. Also, if a downlink grant can be used for SRS triggering, it can trigger the system information block (SIB-2) linked UL component carriers' aperiodic SRS. Therefore, there is an implicit mapping between the component carrier assignment and the component carrier SRS transmission triggering. Thus, when a downlink grant triggers an SRS on the downlink of a component carrier, an SRS may be triggered on an uplink for the same cell. Thus, triggering on the downlink for the SRS results in aperiodic SRS transmissions on the uplinks of the cell. The cell includes the downlink carrier and SIB2 (system information block-2) linked uplink carrier(s).

RRC configured triggering assumes that the uplink (and possibly downlink) grants can trigger aperiodic SRS according to the pre-configured specification. The configured mapping of the bits to the component carrier SRS triggering may be UE-specific and common for all component carriers used by the UE. The bits are part of the grant message. Alternately, the RRC configured triggering may be both UE-specific and component carrier-specific. For the case of triggering with a component carrier-specific configuration, the meaning of the bits is specific to the component carrier for which the grant is intended. In some embodiments, the bits may also specify the resources to be used for aperiodic SRS on each triggered component carrier in addition to describing the carrier indices. Depending on the number of bits devoted for aperiodic SRS triggering, it may be possible to trigger multiple component carriers at the same time. For example, FIG. 6 illustrates a table showing an example configuration for SRS triggering specific to the grants for CC1 and CC2. In contrast, if only the upper half of FIG. 6, i.e., the table for the grant for CC1, is applied, a configuration in which the triggering is UE specific, but common across all component carriers can be achieved. In this case, the bits have a meaning that does not vary across component carriers.

Using a component carrier-specific configuration provides better flexibility than using the configuration common to multiple component carriers, because the small number of bits (e.g., 2) allows many different triggering options to be covered across carriers.

Rules for Overlapping Triggers

Rules are defined to specify the UE (user equipment) behavior if the triggers from different grants are overlapping (e.g., the UE receives multiple aperiodic SRS triggers for the same component carrier, coming from different grants). In the example shown in FIG. 6, if a grant for CC1 includes the bits 11 and a grant for CC2 contains the bits 11, both CC1 and CC2 are overlapping. That is, specific parameters/resources may be designated for CC1 and CC2 in both grants and the UE may not know which grant to follow. For example, in FIG. 6 both the rows marked "11" in the top half, grant for UL CC1, and bottom half, grant for UL CC2, are marked with an x under the columns "SRS on UL CC1." Thus, the UE receives two SRS triggers for the same component carrier, CC1, coming from different grants, grants for CC1 and CC2 respectfully. Exemplary parameters/resources include, timing, hopping pattern, bandwidth, etc.

CC3 is not overlapping because only the grant for CC1 includes trigger bits for CC3. Thus, if there is no overlap, the UE proceeds as instructed. In other words, non-overlapping triggers are each executed as described in the received grant. For the example described above, the aperiodic SRS will be triggered on CC3 based on the grant for CC1 for the grant "11."

Examples of possible rules in case of overlapping triggers are described as follows.

Obey Only the Trigger from the PCC Grant (if Received)

In a first rule, considers a PCC (primary component carrier) grant. When carrier aggregation is configured, the UE has one radio resource control connection with the network. At RRC connection establishment/re-establishment/handover, one serving cell provides the non-access stratum (NAS) mobility information (e.g. tracking area identification), and with a RRC connection re-establishment/handover, one serving cell provides the security input. This cell is referred to as the Primary Cell (PCell). In the downlink, the carrier corresponding to the PCell is the Downlink Primary Component Carrier (DL PCC), while in the uplink it is the Uplink Primary Component Carrier (UL PCC). In the first rule, the UE obeys only the trigger from the PCC (primary component carrier) grant (if received). For example, referring to FIG. 6, if the UE receives a grant for CC1 with field 11 and a grant for CC2 with field 11, and CC2 is the PCC, then, the UE will transmit the aperiodic SRS on CC1 and CC2 according to the SRS parameters defined by the grant for CC2. The SRS parameters may include transmission comb $k_{TC}$, starting physical resource block assignment $n_{RRC}$, duration, srs-ConfigIndex $I_{SRS}$, SRS bandwidth $B_{SRS}$, frequency hopping bandwidth, $b_{hop}$, cyclic shift $n^{cs}{}_{SFS}$, and number of antenna ports $N_p$. If the overlapping trigger is not received on the PCC grant, then the trigger from the component carrier's own grant is used. If the overlapping trigger is not received on the PCC grant, nor on the component carrier's own grant, then the trigger according to the RRC defined priority (or ascending/descending (carrier indicator field) CIF index or some other rule) is used. For example, the RRC defined priority may indicate that grants from CC1 take priority over grants from CC2.

Obey Only the Trigger from CC's Own Grant (if Received)

A second rule provides that the UE will obey only the trigger from the component carrier's own grant (if received). Again, referring to FIG. 6, if the UE receives a grant for CC1 with field 11 and a grant for CC2 with field 11, and CC2 is the PCC, then the UE will transmit the aperiodic SRS on CC1 according to the parameters defined by the grant for CC1, and will transmit the aperiodic SRS on CC2 according to the parameters defined by the grant for CC2. Furthermore, if the overlapping trigger is not received on the component carrier's own grant, then the trigger from the PCC grant will be used. If the overlapping trigger is not received on the PCC grant or on the component carrier's own grant, then the trigger according to the RRC defined priority (or ascending/descending CIF index, or some other rule) will be used.

Obey all Triggers

In another rule, the UE obeys each trigger. For example, if the assigned resources for aperiodic SRS are the same in each trigger, then the UE transmits the SRS on the assigned resources. If the resources used for aperiodic SRS are specific to the trigger (i.e., each trigger assigns different resources), then the UE transmits different aperiodic SRS transmissions, one for each assignment. For example, multiple SRS transmissions may occur, each with different resources, as indicated by the different grants.

Interpret Overlapping Triggers as an Error Event

Another rule provides that the overlapping triggering is to be interpreted by the UE as an error event, and no aperiodic SRS is triggered. In this embodiment, the eNB is expected to enforce non-overlapping triggering. If the UE receives overlapping triggering, the UE generally will not initiate an aperiodic SRS transmission. In one embodiment, an error event assumes that no SRS is triggered by the grants that have overlapping triggers. On the example described above, there will be no aperiodic SRS on CC3 even though there is no overlap for it, but the grant for CC1 that carries the trigger for CC3 has other overlapping events. In another embodiment, the error event assumes only overlapping triggers. In the example above, the error event would be CC1 and CC2, while CC3 would have aperiodic SRS transmission.

As stated above, in addition to carrier indices shown in the tables in FIG. 6, the bits for aperiodic SRS triggering may also specify resources to be used for aperiodic SRS transmission on each triggered component carrier. The information for triggering and the resources for each carrier may be separately or jointly coded. While the table illustrated in FIG. 6 uses a 2-bit example, additional bits may be added for additional flexibility in aperiodic SRS triggering among component carriers within a UE and among different UEs. In one embodiment, three bits are devoted for the purpose of dynamic indication of the aperiodic SRS resources and/or the triggering for a specific carrier. In one embodiment, the resource information can be frequency information, such as bandwidth allocation, time information, such as a time instance, and/or sequencing information, such as the SRS sequence. Time instance may refer to the time offset defined for each component carrier. In one aspect, different time offset values are provided for different carriers, such that although triggered at the same time, aperiodic SRS transmissions on different component carriers do not occur simultaneously in time. When there is an aperiodic SRS transmission on a component carrier on a specific time instance, a data channel (e.g., PUSCH) of the same user equipment on any component carrier is punctured on the symbol on which the aperiodic SRS is transmitted.

In addition to the grant-based aperiodic SRS triggering, DCI (downlink control information) formats 3/3A may be utilized for aperiodic SRS triggering. The DCI is a message carried by a PDCCH. It includes control information such as resource assignments for a UE or a group of UEs. The control information sent on each PDCCH may convey one or more downlink grants, one or more uplink grants, power control information, and/or other information. Different scenarios require that different parameters be signaled. The DCI message has different formats which signal different parameters. DCI formats 3/3A are for group power control. DCI format 3 provides TPC commands for 2-bit power adjustments in the PUCCH and PUSCH for multiple users. DCI format 3A provides TPC commands for 1-bit power adjustments in the PUCCH and PUSCH for multiple users. In group power control, TPC-indexes (transmit power control indexes) for each component carrier can be configured. Similarly, SRS-indexes for each component carrier may be defined. The triggers may be transmitted together with group TPC, or separately scrambled with SRS-Aperiodic-RNTI (radio network temporary identifier). In one embodiment, the SRS index is configured to define a location of the trigger information in a received group power control block. The SRS index may be component carrier specific, common for a plurality of component carriers and/or common for a group of component carriers.

Figure 7A:
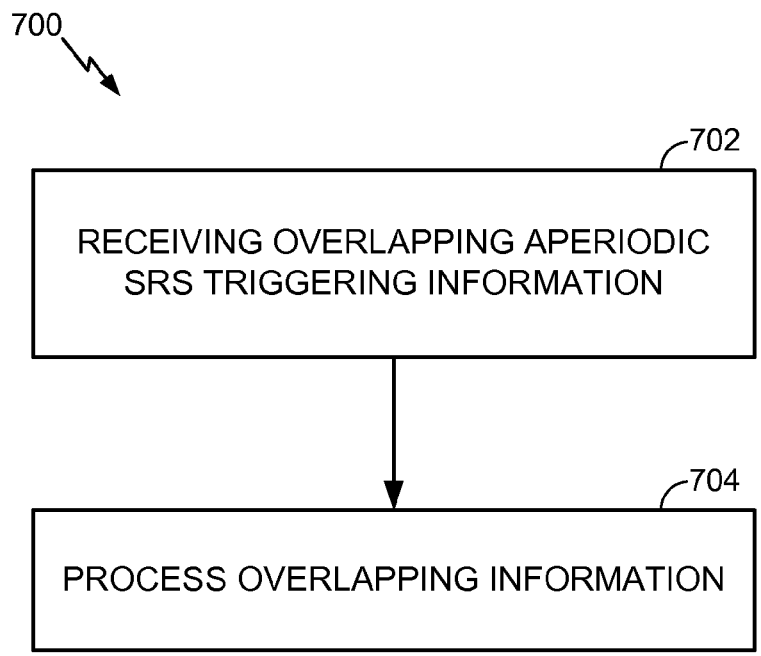
FIGS. 7A-7B are flow charts illustrating methods of aperiodic transmission of SRSs in a carrier aggregation configuration.

FIG. 7A is a flowchart showing a method 700 of wireless communication. The method includes receiving overlapping aperiodic SRS triggering information at block 702. At block 704 the overlapping information is processed.

Figure 7B:
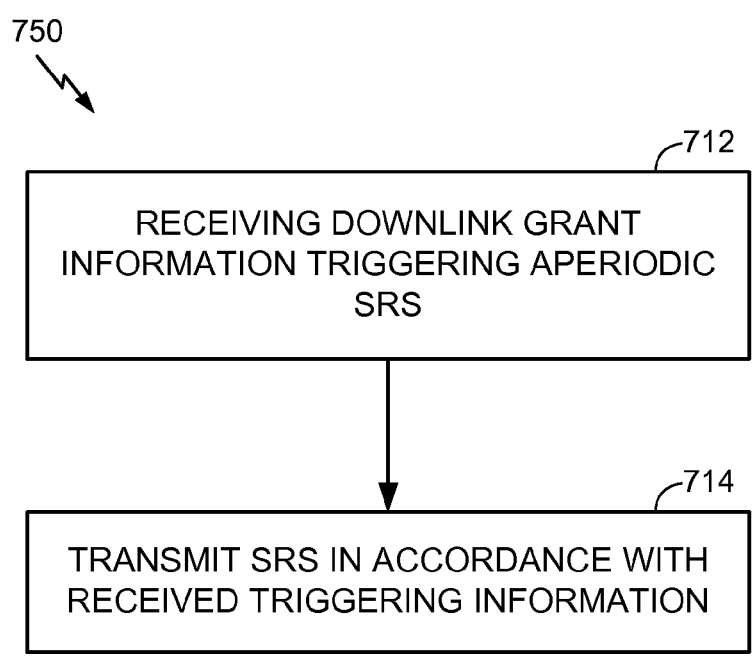

FIG. 7B is a flowchart showing a method 750 of wireless communication. The method includes receiving downlink grant information triggering aperiodic SRS transmission at block 712. At block 714 the SRS is transmitted in accordance with the received triggering information.

Figure 8A:
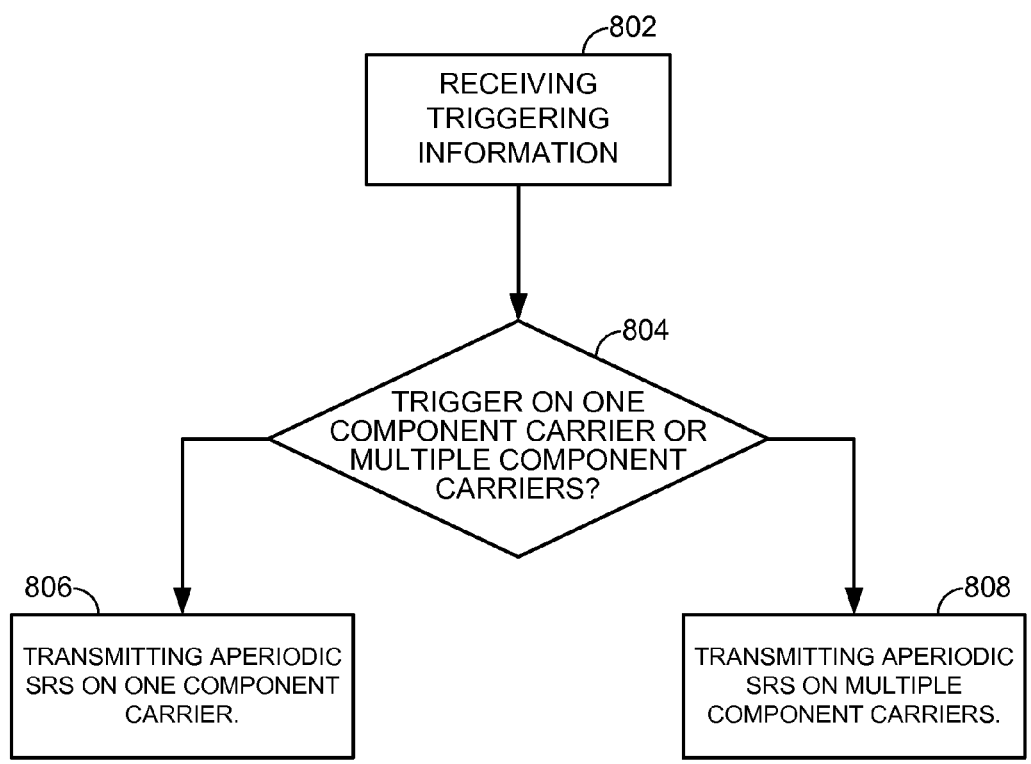
FIG. 8A is a flowchart of a method of triggering which may be common for all component carriers or component carrier-specific.

FIGS. 8A-8E are flowcharts illustrating methods of aperiodic SRS transmission in a carrier aggregation configuration. In FIG. 8A, block 802, the UE receives triggering information. In block 804, the UE determines if the triggering is for one component carrier or multiple component carriers. In block 806, the SRS triggering is UE specific and for one component carriers. In block 808, the SRS triggering is UE specific and for multiple component carriers.

Figure 8B:
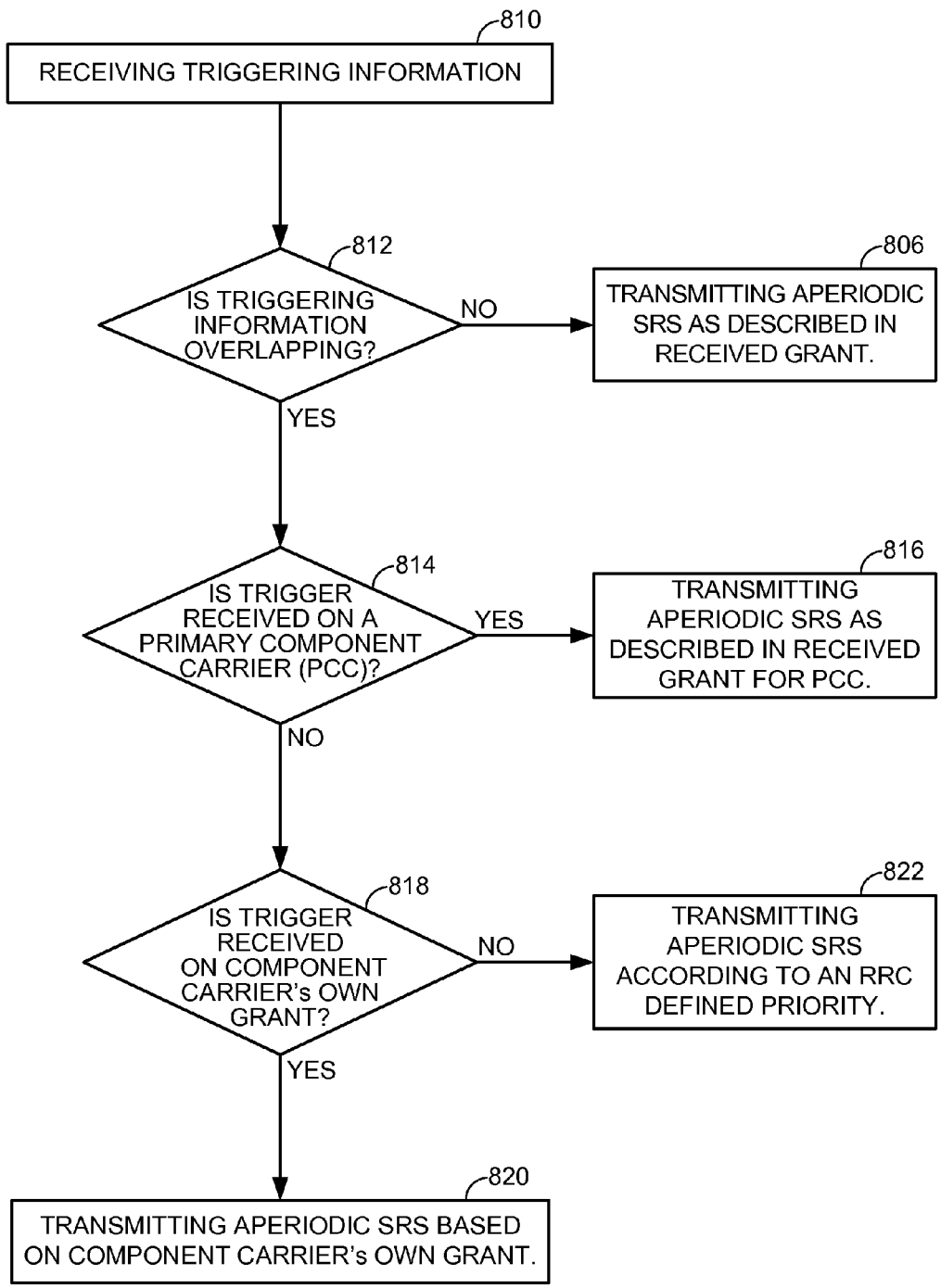
FIG. 8B is a flowchart of a method of triggering when the triggering information may be overlapping.

In FIG. 8B, block 810, the UE receives triggering information. In block 812, the UE decides whether the triggering information is overlapping. If the triggering information is not overlapping, the UE transmits an aperiodic SRS as described in the received trigger. See block 806. If the triggering information is overlapping, the UE determines if the trigger is received on a PCC at block 814. If the trigger is received on a PCC, at block 816 the UE transmits an aperiodic SRS configured according to the trigger received on the PCC. If the trigger is not received on a PCC, at block 818 the UE determines if the trigger is received on the component carrier's own grant. If so, the UE transmits an aperiodic SRS based on the trigger received in the CC's own grant at block 820. If the trigger is not received on the component carrier's own grant, the UE transmits an aperiodic SRS according to a trigger selected based on an RRC defined priority at block 822.

Figure 8C:
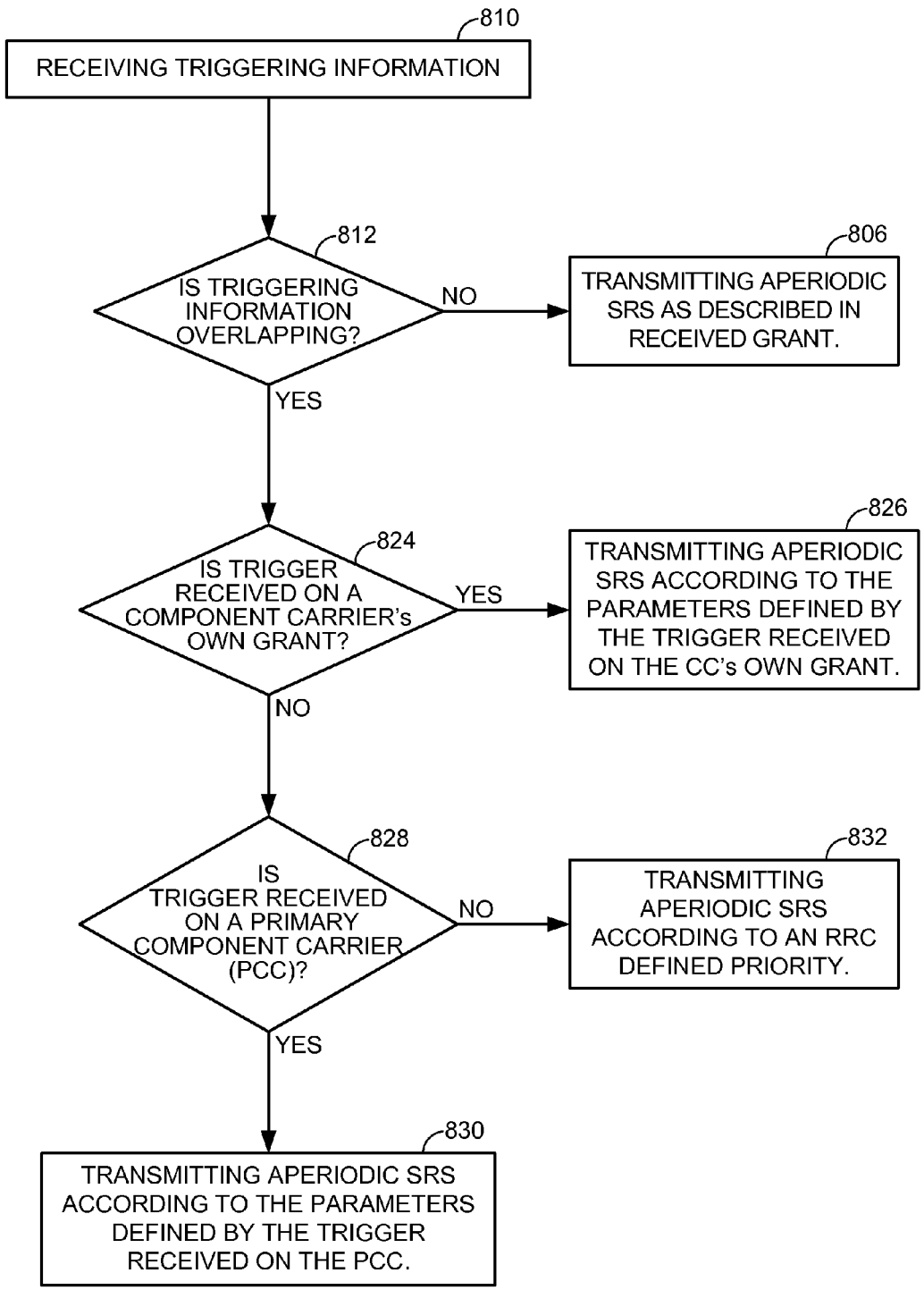
FIG. 8C is a flowchart of a method of triggering when the triggering information may be overlapping.

In FIG. 8C, at block 810, the UE receives triggering information. In block 812, the UE decides whether the triggering information is overlapping. If the triggering information is not overlapping, the UE transmits an aperiodic SRS configured by the received triggering information. See block 806. If the triggering information is overlapping, the UE determines if the trigger is received on the component carrier' own grant at block 824. If the trigger is received on the CC's own grant, the UE transmits an aperiodic SRS as described in the grant received on the CC. See block 826. If the trigger is not received on the CC's own grant, the UE determines if the grant is received on a PCC, at block 828. If the grant is received on the PCC, the UE transmits an aperiodic SRS according to the parameters defined by the trigger received on the PCC. See block 830. If the grant is not received on the PCC, the UE transmits an aperiodic SRS according to a trigger selected based on an RRC defined priority. See block 832.

Figure 8D:
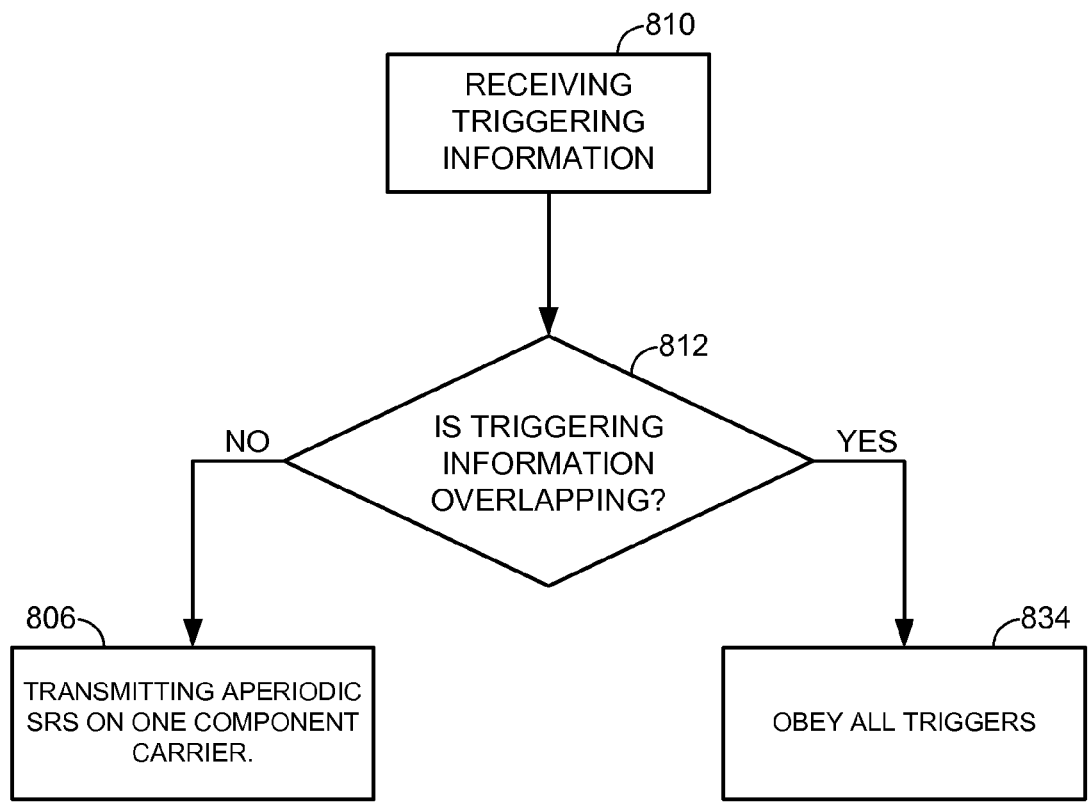
FIG. 8D is a flowchart of a method of triggering when the triggering information may be overlapping.

In FIG. 8D, block 810, the UE receives triggering information. In block 812, the UE decides whether the triggering information is overlapping. For example, the aperiodic SRS could have been triggered by both an uplink grant and a downlink grant at the same time. If the triggering information is not overlapping, the UE transmits an aperiodic SRS using the resources described in the received triggering information. See block 806. If the triggering information is overlapping, the UE obeys all triggers, at block 834. For example, if the configurations differ, multiple SRS will be transmitted. If the configurations are consistent, the SRS is transmitted in accordance with the unique configuration. Such a rule may apply both with and without a carrier aggregation configuration.

Figure 8E:
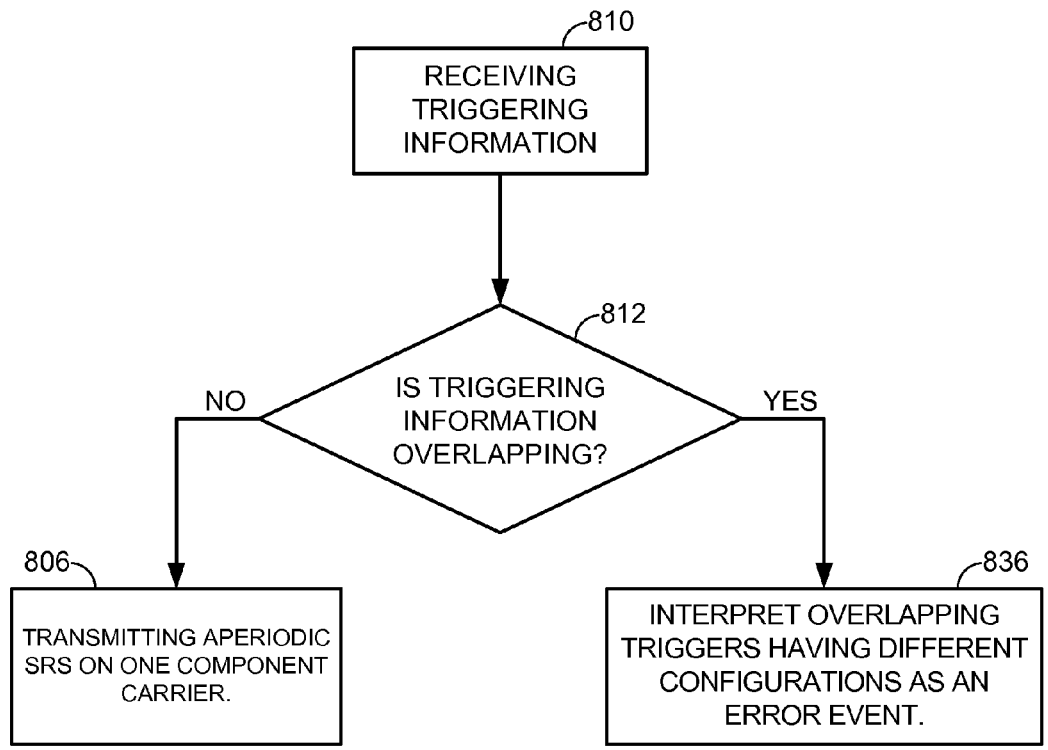
FIG. 8E is a flowchart of a method of triggering when the triggering information may be overlapping.

In FIG. 8E, block 810, the UE receives triggering information. In block 812, the UE decides whether the triggering information is overlapping. If the triggering information is not overlapping, the UE transmits an aperiodic SRS configured by the received triggering information. See block 806. If the triggering information is overlapping and includes differing configuration information, the UE interprets the overlapping triggers as an error event and no aperiodic SRS is triggered. See block 836.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication for a single device in a wireless system, comprising:
   receiving overlapping triggers, the overlapping triggers each comprising information triggering an aperiodic sounding reference signal (SRS) transmission on a particular component carrier, the information received from different grants received from at least one serving base station; and
   processing the overlapping triggers in accordance with the information, wherein processing the overlapping triggers comprises interpreting the overlapping triggers as an error event such that no aperiodic SRS transmission occurs.

2. The method of claim 1, wherein:
   the information comprises consistent configuration information for the aperiodic SRS transmission; and
   the processing comprises transmitting an aperiodic SRS in accordance with the configuration information.

3. The method of claim 1, wherein:
   the information comprises dissimilar configurations for the aperiodic SRS transmission; and
   the processing comprises treating the overlapping triggers as an error event.

4. The method of claim 1, wherein the information comprises a trigger received in an uplink grant and a trigger received in a downlink grant, the downlink grant carrying control information for a downlink data transmission.

5. The method of claim 1, wherein the wireless system comprises a multicarrier system including a plurality of component carriers.

6. An apparatus for wireless communication in a wireless system, the apparatus being a single device and comprising:
   means for receiving overlapping triggers, the overlapping triggers each comprising information triggering an aperiodic sounding reference signal (SRS) transmission on a particular component carrier, the information received from different grants received from at least one serving base station; and
   means for processing the overlapping triggers in accordance with the information, wherein processing the overlapping triggers comprises interpreting the overlapping triggers as an error event such that no aperiodic SRS transmission occurs.

7. The apparatus of claim 6, wherein:
   the information comprises consistent configuration information for the aperiodic SRS transmission; and
   the processing means comprises means for transmitting an aperiodic SRS in accordance with the configuration information.

8. The apparatus of claim 6, wherein:
   the information comprises dissimilar configurations for the aperiodic SRS transmission; and
   the processing means comprises means for treating the overlapping triggers as an error event.

9. The apparatus of claim 6, wherein the information comprises a trigger received in an uplink grant and a trigger received in a downlink grant, the downlink grant carrying control information for a downlink data transmission.

10. The apparatus of claim 6, wherein the wireless system comprises a multicarrier system including a plurality of component carriers.

11. An apparatus for wireless communication in a wireless system, the apparatus being a single device and comprising:
    a transceiver configured to receive overlapping triggers;
    a memory; and
    at least one processor coupled to the memory and configured:
       to receive the overlapping triggers from the transceiver, the overlapping triggers comprising information triggering aperiodic sounding reference signal (SRS) transmission on a particular component carrier, the information received from different grants received from at least one serving base station, and
       to process the information in accordance with the information, wherein processing the overlapping triggers comprises interpreting the overlapping triggers as an error event such that no aperiodic SRS transmission occurs.

12. The apparatus of claim 11, wherein:
    the information comprises consistent configuration information for the aperiodic SRS transmission; and
    the at least one processor is further configured to process the information by transmitting an aperiodic SRS in accordance with the configuration information.

13. The apparatus of claim 11, wherein:
    the information comprises dissimilar configurations for the aperiodic SRS transmission; and
    the at least one processor is further configured to process the information by treating the overlapping triggers as an error event.

14. The apparatus of claim 11, wherein the information comprises a trigger received in an uplink grant and a trigger received in a downlink grant, the downlink grant carrying control information for a downlink data transmission.

15. The apparatus of claim 11, wherein the wireless system comprises a multicarrier system including a plurality of component carriers.

16. A non-transitory computer-readable medium having non-transitory program code recorded thereon for wireless communication for a single device in a wireless network, the program code causing a processor to:
    receive overlapping triggers, the overlapping triggers each comprising information triggering aperiodic sounding reference signal (SRS) transmission on a particular component carrier, the information received from different grants received from at least one serving base station; and
    process the overlapping triggers in accordance with the information, wherein processing the overlapping triggers comprises interpreting the overlapping triggers as an error event such that no aperiodic SRS transmission occurs.

* * * * *